(12) United States Patent
Merlo et al.

(10) Patent No.: US 11,054,431 B2
(45) Date of Patent: Jul. 6, 2021

(54) BARCODE SCANNING OF BULK SAMPLE CONTAINERS

(71) Applicant: Diagnostic Instruments, Inc., Sterling Heights, MI (US)

(72) Inventors: Philip T. Merlo, Clarkston, MI (US); John Jacob Torongo, Thompsonville, MI (US); Matthew Andrew Laise, Utica, MI (US); Patrick Aloysius Merlo, Troy, MI (US); Larry Michaels, Southfield, MI (US)

(73) Assignee: Diagnostic Instruments, Inc., Sterling Heights, MI (US)

( * ) Notice: Subject to any disclaimer, the term of this patent is extended or adjusted under 35 U.S.C. 154(b) by 0 days.

(21) Appl. No.: 16/656,680

(22) Filed: Oct. 18, 2019

(65) Prior Publication Data

US 2020/0124631 A1   Apr. 23, 2020

Related U.S. Application Data

(60) Provisional application No. 62/766,464, filed on Oct. 19, 2018.

(51) Int. Cl.
*G06K 7/10* (2006.01)
*G01N 35/00* (2006.01)
(Continued)

(52) U.S. Cl.
CPC ... *G01N 35/00732* (2013.01); *G01N 35/0095* (2013.01); *G01N 35/10* (2013.01);
(Continued)

(58) Field of Classification Search
CPC ............. G01N 35/00732; G01N 35/10; G01N 35/0095; G01N 2035/00752;
(Continued)

(56) References Cited

U.S. PATENT DOCUMENTS 9,208,621 B1 * 12/2015 Skaaksrud ............... G06K 9/00
9,607,365 B1 *  3/2017 Joffre ........................ G06T 5/50
(Continued)

FOREIGN PATENT DOCUMENTS

| WO | 2015040320 | 3/2015 |
| WO | 2019091589 | 5/2019 |
| WO | 2019091597 | 5/2019 |

OTHER PUBLICATIONS

International Search Report and Written Opinion of the International Searching Authority from corresponding Patent Cooperation Treaty (PCT) Application No. PCT/IB2019/058915, dated Jan. 17, 2020.

*Primary Examiner* — Seung H Lee
(74) *Attorney, Agent, or Firm* — Gardner, Linn, Burkhart & Ondersma LLP

(57) ABSTRACT

An apparatus is provided for scanning and decoding barcodes in a tray or other container containing multiple items, such as tissue samples, that are identified with discrete barcodes. The apparatus includes an imager, a lighting system, and a processor. The imager is configured to capture images within a selectable field of view. At least a portion of a bulk sample container, which is configured to carry a plurality of sample/tissue containers, is positioned within the field of view. The lighting system is configured to evenly light the field of view. The processor is configured to receive the captured images from the imager. The processor is further configured to analyze a first image of the captured images and to detect and decode the barcodes present in the first image.

20 Claims, 15 Drawing Sheets

(51) Int. Cl.
 *G01N 35/10* (2006.01)
 *G06K 7/14* (2006.01)

(52) U.S. Cl.
 CPC ....... *G06K 7/10722* (2013.01); *G06K 7/1413* (2013.01); *G01N 2035/00752* (2013.01); *G01N 2035/1027* (2013.01)

(58) Field of Classification Search
 CPC ..... G01N 2035/1027; G01N 2001/315; G01N 2001/366; G01N 2035/00801; G06K 7/10722; G06K 7/1413; G06K 9/00; B01L 3/545
 See application file for complete search history.

(56) References Cited

U.S. PATENT DOCUMENTS

| | | |
|---|---|---|
| 9,904,498 B2 * | 2/2018 | Panda .................. G06F 3/1285 |
| 9,904,831 B2 | 2/2018 | Wilhelm |
| 2009/0078772 A1 | 3/2009 | Ofek et al. |
| 2009/0212113 A1 | 8/2009 | Chiu et al. |
| 2009/0296168 A1 | 12/2009 | Proudfoot et al. |
| 2013/0292473 A1 | 11/2013 | Söderberg et al. |
| 2013/0306729 A1 | 11/2013 | Dilks et al. |
| 2014/0330427 A1 | 11/2014 | Wilhelm |
| 2016/0025757 A1 | 1/2016 | Pollack et al. |
| 2017/0293719 A1 | 10/2017 | Roig Munill et al. |

\* cited by examiner

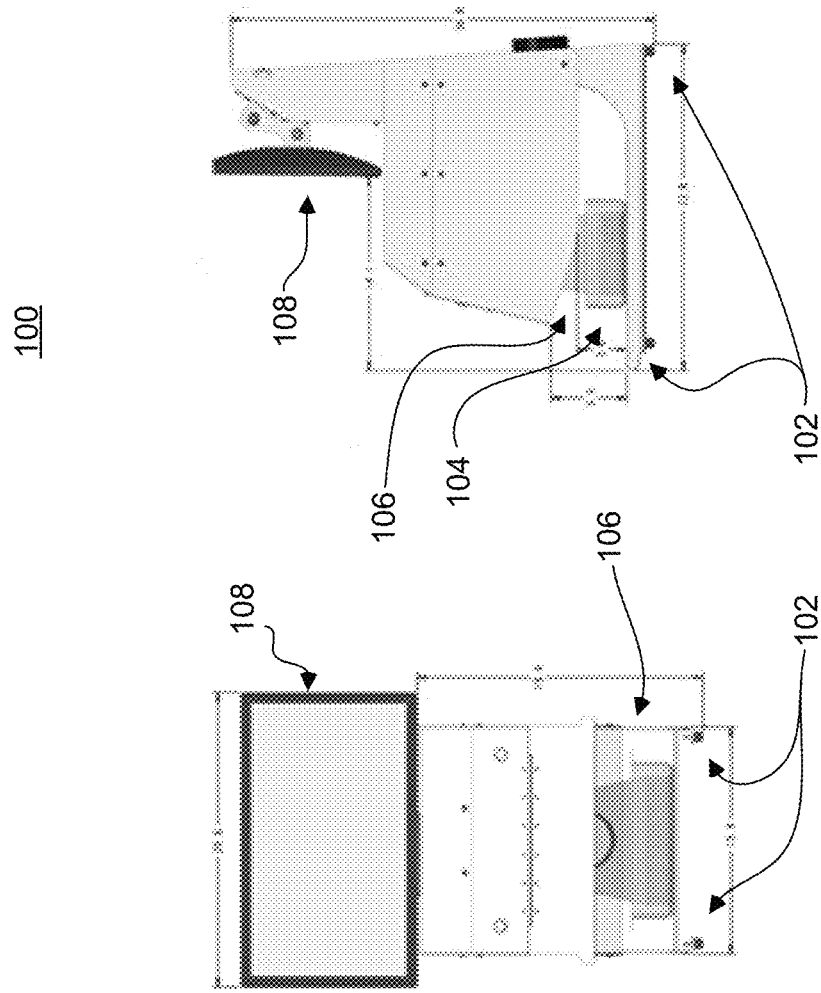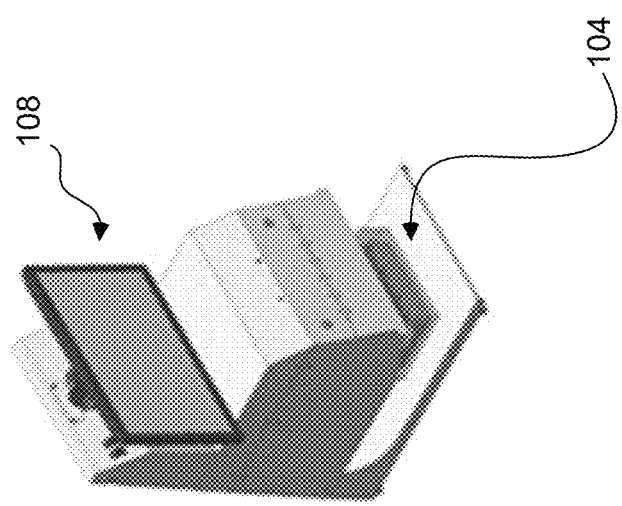

FIG. 2
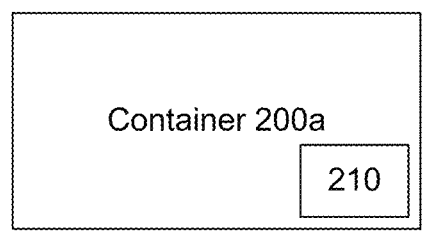
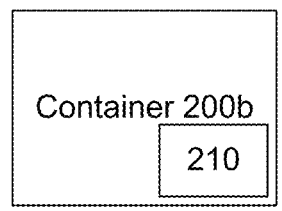
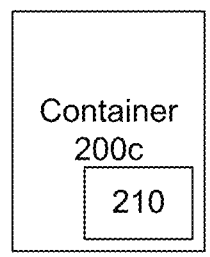

1" (25mm) x 3" (75mm)
Microscopy Slide

1" (25mm) x 3" (75mm)
Microscopy Slide
Side View

1" (25mm) x 3" (75mm)
Microscopy Slide
Front View

Small Cassette

Small Cassette (Front View w/Barcode)

Small Cassette (Side View)

Small Cassette w/ specimen in wax

Small Cassette w/ specimen in wax
(Front View w/Barcode)

Small Cassette w/ specimen in wax
(Side View)

Large Cassette

Large Cassette (Front View)

Large Cassette (Side View)

Large Cassette with Wax

Large Cassette with Wax
(Front View)

Large Cassette with Wax
(Side View)

Drawer With Cassettes

Drawer With Cassettes Side View

Drawer With Cassettes Front View

Slide Holder (Short Side View)

Slide Holder (Long Side View)

Cassette Basket Front

Cassette Basket Side

BARCODE SCANNING OF BULK SAMPLE CONTAINERS

CROSS REFERENCE TO RELATED APPLICATIONS

The present application claims the filing benefits of U.S. provisional application, Ser. No. 62/766,464, filed Oct. 19, 2018, which is hereby incorporated by reference herein in its entirety.

FIELD OF THE INVENTION

The present invention is directed to the scanning of barcodes, and in particular, barcodes of multiple products carried together in containers.

BACKGROUND OF THE INVENTION

Conventional tissue/sample containers (e.g., tissue biopsy cassettes, microscope slides, and other tissue sample carriers), used for both transport and storage, are individually identified with machine readable barcodes, such as one-dimensional barcodes that are a series of parallel lines and two-dimensional data matrix barcodes (e.g., QR barcodes). These barcodes are read with barcode readers, or manually entered into computer systems using human-readable characters associated with the barcodes. While the tissue/sample containers may be held in bulk sample containers configured to hold a number of tissue/sample containers, each of the barcodes on the individual tissue/sample containers is individually read and processed.

SUMMARY OF THE INVENTION

Embodiments of the present invention provide an apparatus and methods for imaging tissue biopsy cassettes, microscope slides, and other sample containers (also known herein as tissue/sample containers), as well as bulk sample containers containing tissue/sample containers. Barcodes depicted in the images may be located, scanned, and decoded. In an aspect of the invention, a single image of a bulk sample container may be scanned to locate and decode each of the barcodes printed on the tissue/sample containers in the bulk sample container. In this manner, each tissue/sample container may be tracked and positively identified at any stage of handling, such as in a laboratory facility. Furthermore, stored images may be indexed for future comparisons between initial tissue cuttings and final stained slide images.

In an aspect of the present invention, an apparatus for scanning and decoding barcodes includes an imager, a lighting system, and a processor. The imager is configured to capture images within a selectable field of view. At least a portion of a sample/tissue container or a bulk sample container configured to carry a plurality of sample/tissue containers is positioned within the field of view. The lighting system is configured to evenly light the field of view. The processor is configured to receive the captured images from the imager. The processor is further configured to analyze a first image of the captured images and to detect and decode barcodes present in the first image.

In a further aspect of the present invention, a method for scanning and decoding barcodes includes positioning a sample/tissue container or a bulk sample container configured to carry a plurality of sample/tissue containers within a selectable field of view. The field of view is evenly lighted with a polarized light. The method further includes capturing images within the field of view. A first image of the captured images includes a depiction of at least one barcode. The first image is analyzed to detect and decode the at least one barcode present in the first image.

Thus, sample/tissue containers and bulk sample containers (carrying sample/tissue containers) may be imaged so that barcodes printed on the sample/tissue containers may be located, scanned, and decoded. A further benefit is that the barcodes on sample/tissue containers carried on a bulk sample container may be located and scanned on a single image after image processing steps are taken on the image to improve the depicted barcodes.

These and other objects, advantages, purposes and features of the present invention will become apparent upon review of the following specification in conjunction with the drawings.

BRIEF DESCRIPTION OF THE DRAWINGS

FIG. 1A is a perspective view of a barcode scanning apparatus in accordance with the present invention;

FIG. 1B is a front elevation of the barcode scanning apparatus of FIG. 1A;

FIG. 1C is a left side elevation of the barcode scanning apparatus of FIG. 1A;

FIG. 2 is a diagrammatic view of exemplary tissue/sample containers with barcodes;

DESCRIPTION OF THE PREFERRED EMBODIMENTS

Figure 6A:
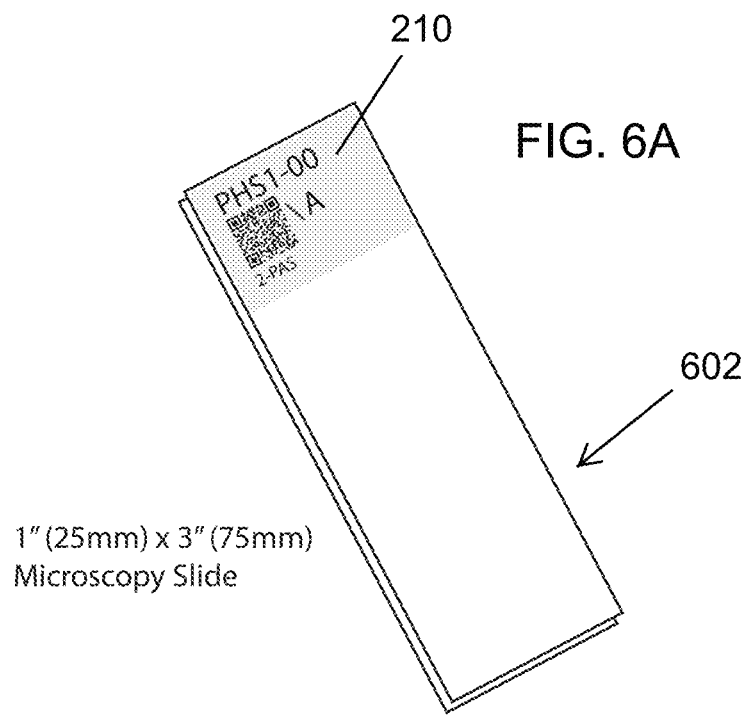
FIG. 6A is a perspective view of a 1"×3" microscopy slide illustrating the placement of a barcode in accordance with the present invention.
Figure 6B:
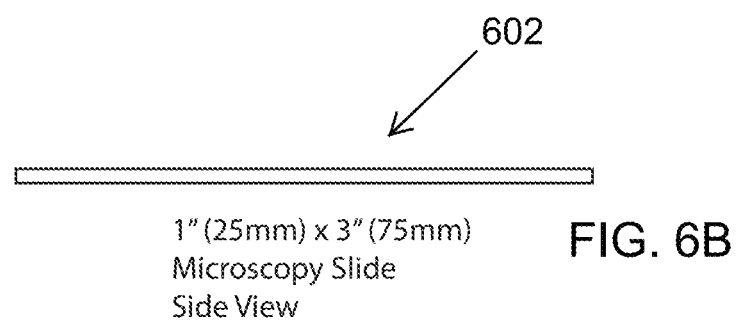
FIG. 6B is a side view of the microscopy slide of FIG. 6A.
Figure 6C:
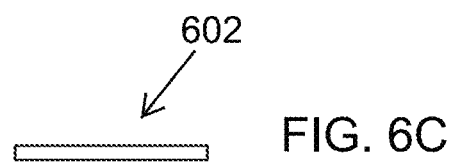
FIG. 6C is a front view of the microscopy slide of FIG. 6A.
Figure 7A:
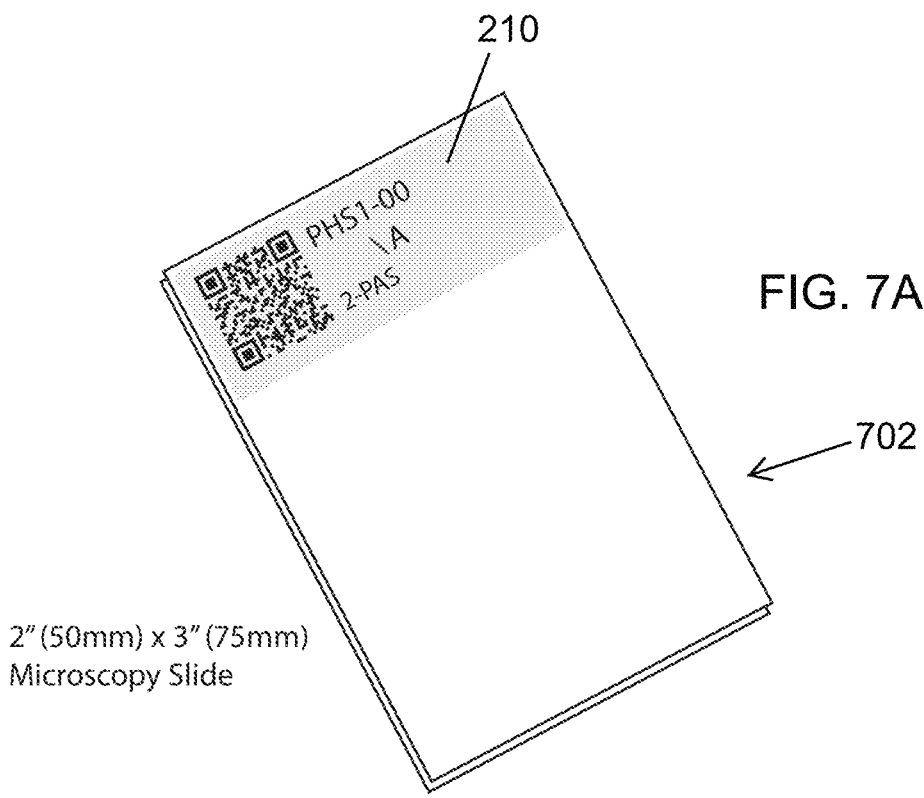
FIG. 7A is a perspective view of a 2"×3" microscopy slide illustrating the placement of a barcode in accordance with the present invention.
Figure 7B:
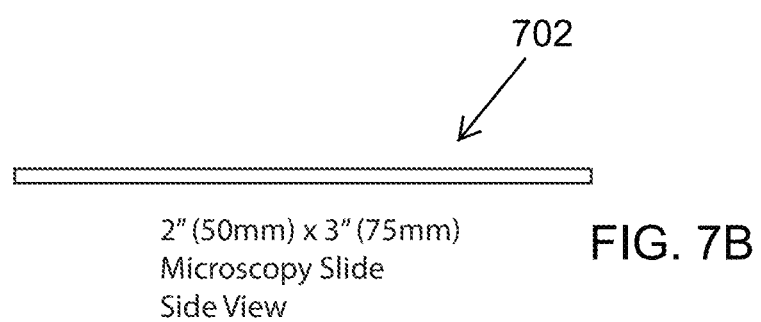
FIG. 7B is a side view of the microscopy slide of FIG. 7A.
Figure 7C:
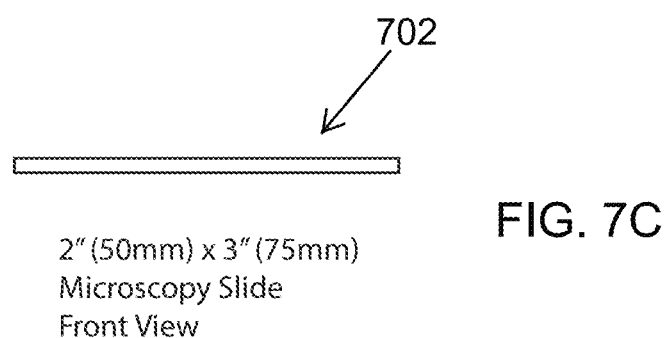
FIG. 7C is a front view of the microscopy slide of FIG. 7A.
Figure 8A:
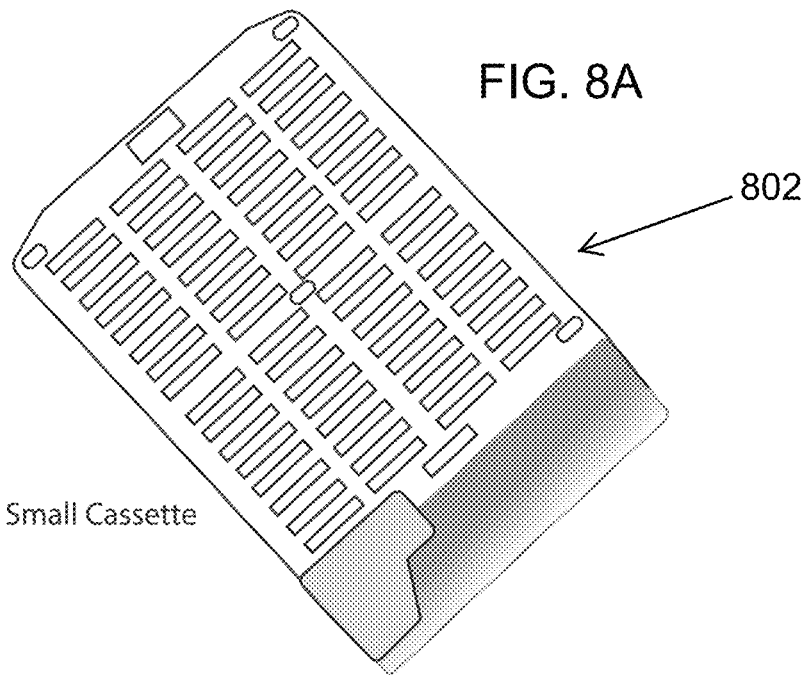
FIG. 8A is a top down view of a small cassette in accordance with the present invention.
Figure 8B:
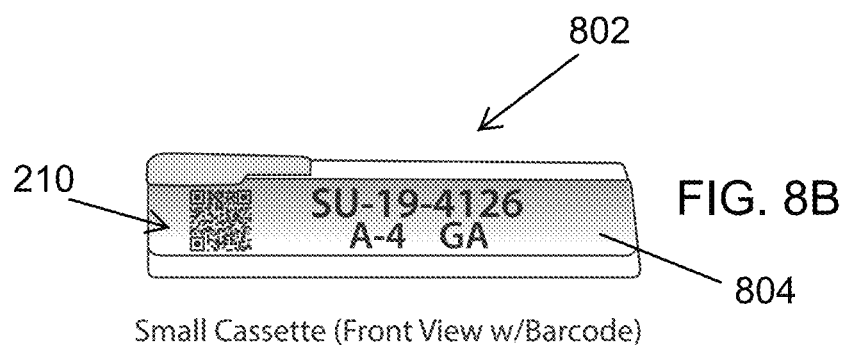
FIG. 8B is a front view of the small cassette of FIG. 8A illustrating the placement of a barcode.
Figure 8C:
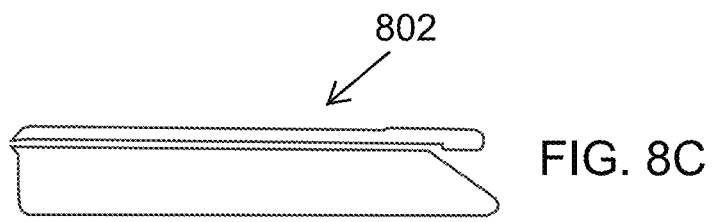
FIG. 8C is a side view of the small cassette of FIG. 8A.
Figure 9A:
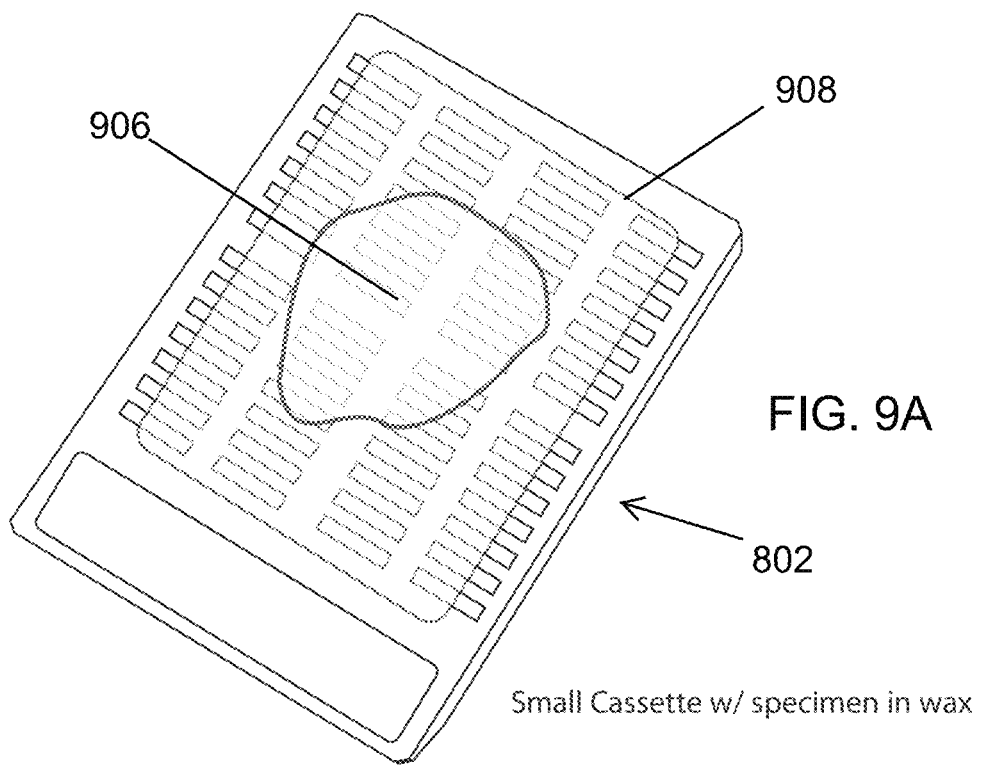
FIG. 9A is a perspective view of the small cassette of FIG. 8A illustrating a specimen in wax placed on the small cassette.
Figure 9B:
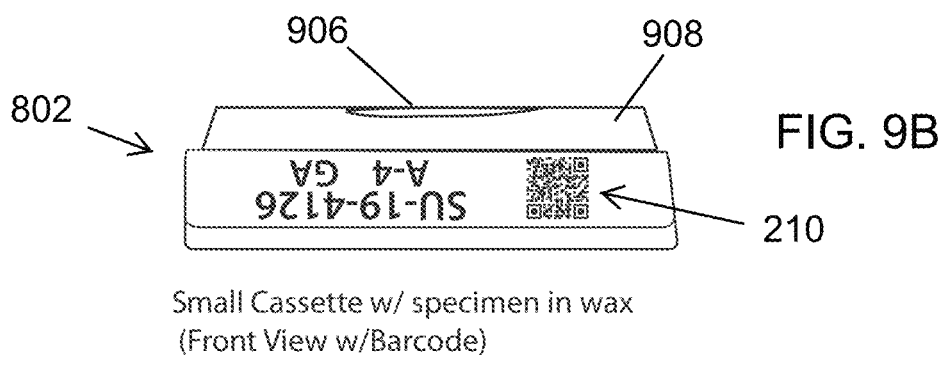
FIG. 9B is a front view of the small cassette of FIG. 9A illustrating the specimen in wax placed on the small cassette.
Figure 9C:
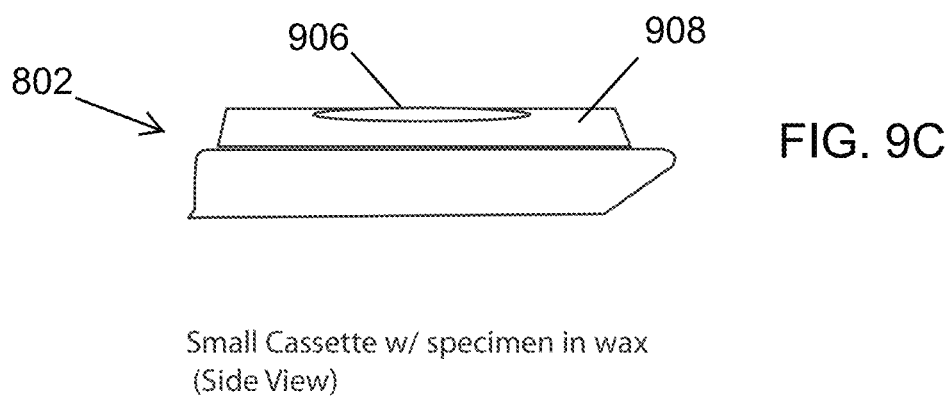
FIG. 9C is a side view of the small cassette of FIG. 9A illustrating the specimen in wax placed on the small cassette.
Figure 10A:
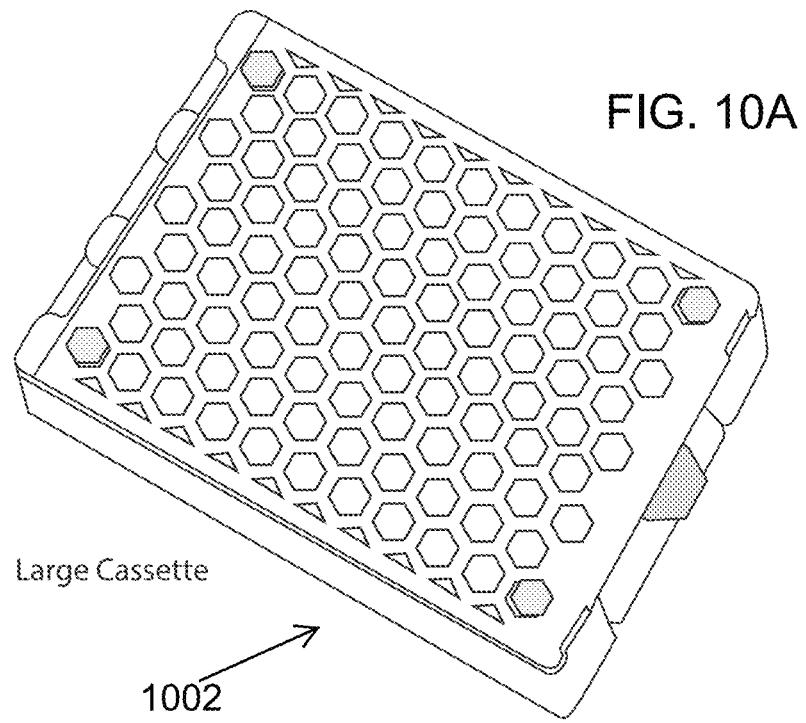
FIG. 10A is a perspective view of a large cassette in accordance with the present invention.
Figure 10B:
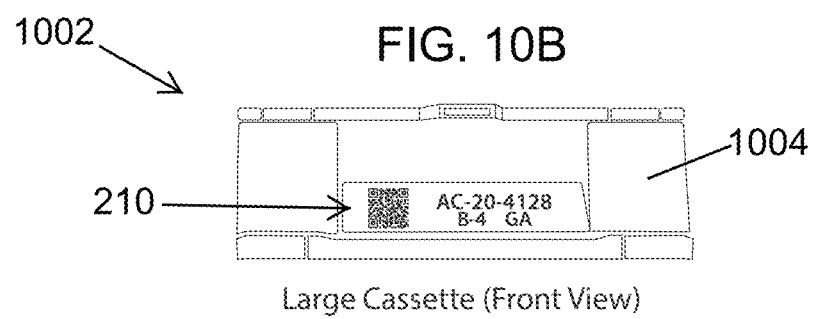
FIG. 10B is a front view of the large cassette of FIG. 10A illustrating the placement of a barcode.
Figure 10C:
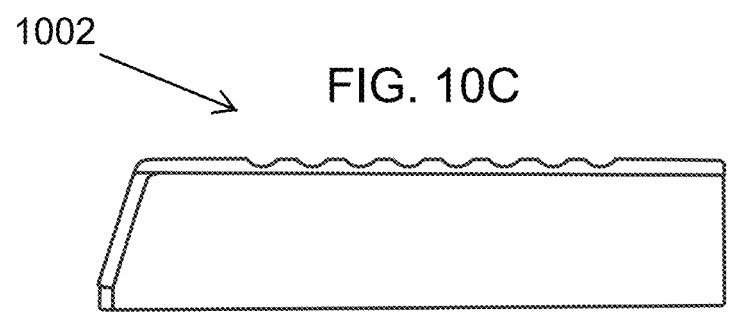
FIG. 10C is a side view of the large cassette of FIG. 10A.
Figure 11A:
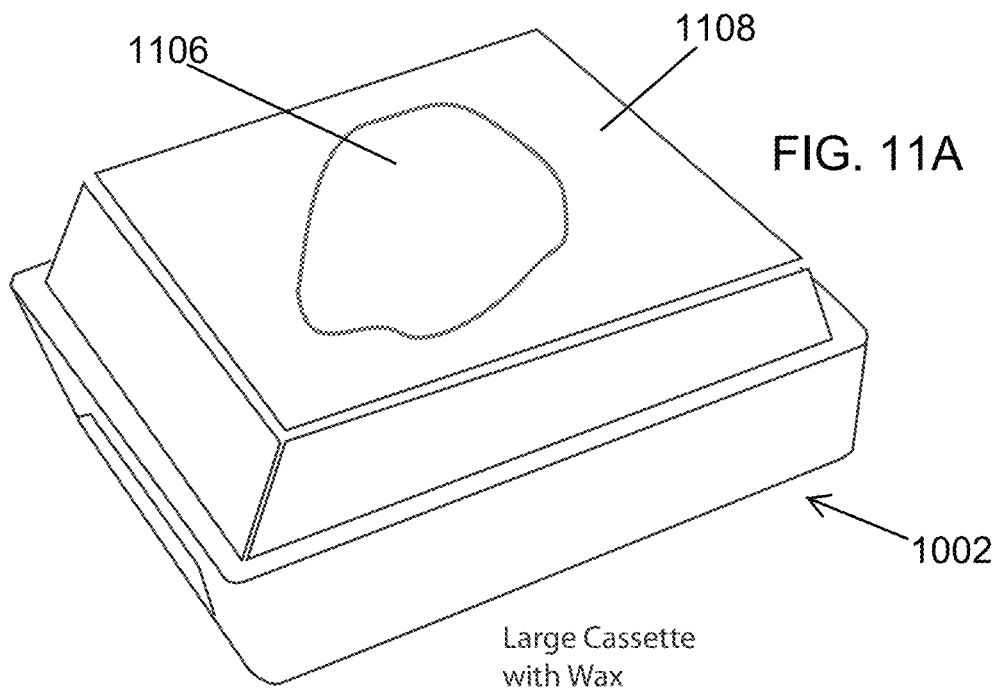
FIG. 11A is a perspective view of the large cassette of FIG. 10A illustrating the placement of wax on the large cassette.
Figure 11B:
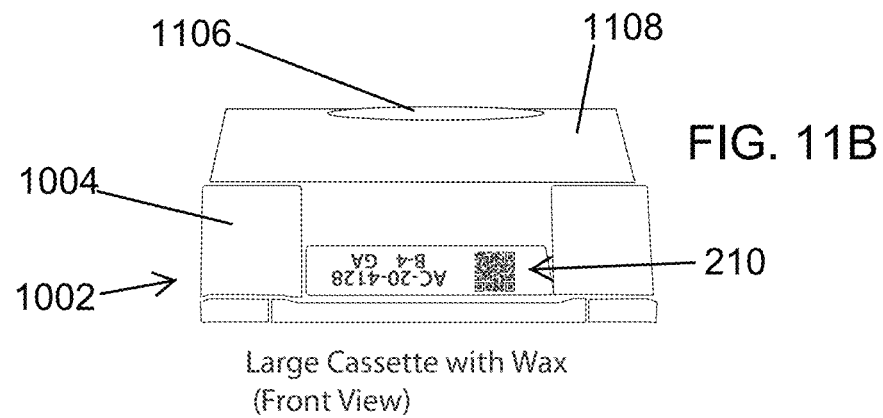
FIG. 11B is a front view of the large cassette of FIG. 11A illustrating the placement of wax on the large cassette and the placement of a barcode.
Figure 11C:
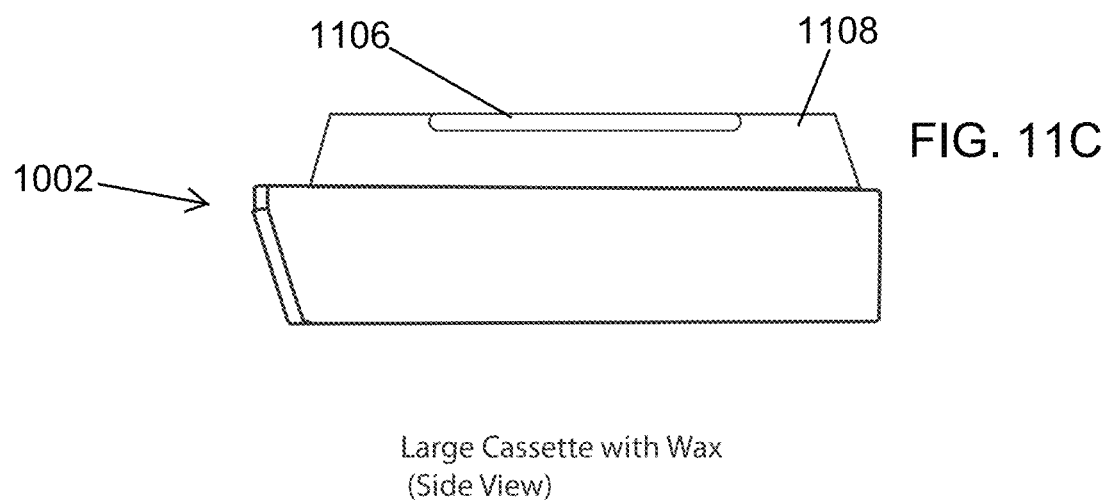
FIG. 11C is a side view of the large cassette of FIG. 11A illustrating the placement of wax on the large cassette.

Referring to the drawings and the illustrative embodiments depicted therein, an apparatus and methods are provided for imaging tissue/sample containers, such as tissue biopsy cassettes, microscope slides, and other tissue containers, as well as bulk sample containers that contain multiple tissue/sample containers. Codes, such as one-dimensional barcodes comprising a series of parallel lines, or two-dimensional matrix barcodes (e.g., QR codes), are affixed on each individual microscope side, tissue cassette, or container. The term "barcode" is used herein to describe any type of machine-readable optical indicia. Barcodes depicted in the images may be located and decoded when the images are scanned by image processing methods described herein. In an aspect of the invention, a single image of a bulk sample container may be scanned to locate and decode each of the barcodes on the tissue/sample containers in the bulk sample container. For example, as illustrated in FIG. 2, tissue/sample containers (200a, 200b, 200c) may be individually imaged and then scanned so that their respective barcodes 210 may be located and decoded. While FIG. 2 illustrates three exemplary tissue/sample containers (200a-c), additional types of tissue/sample containers are also anticipated. For example, FIGS. 6A-6C depict an exemplary 1"×3" microscopy slide 602 with a barcode 210 positioned upon a surface of the microscopy slide, while FIGS. 7A-7C depict an exemplary 2"×3" microscopy slide 702 with a barcode 210 positioned upon a surface of the microscopy slide 702. FIGS. 8A-8C depict an exemplary small cassette 802 with a barcode 210 positioned upon a front side 804 of the small cassette 802, while FIGS. 10A-10C depict an exemplary large cassette 1002 with a barcode 210 positioned upon a front side 1004 of the large cassette 1002. FIGS. 9A-9C illustrate the small cassette 802 of FIGS. 8A-8C with a specimen 906 imbedded in wax 908, while FIGS. 11A-11C illustrate the large cassette 1002 of FIGS. 10A-10C with a specimen 1106 imbedded in wax 1108.

Figure 3:
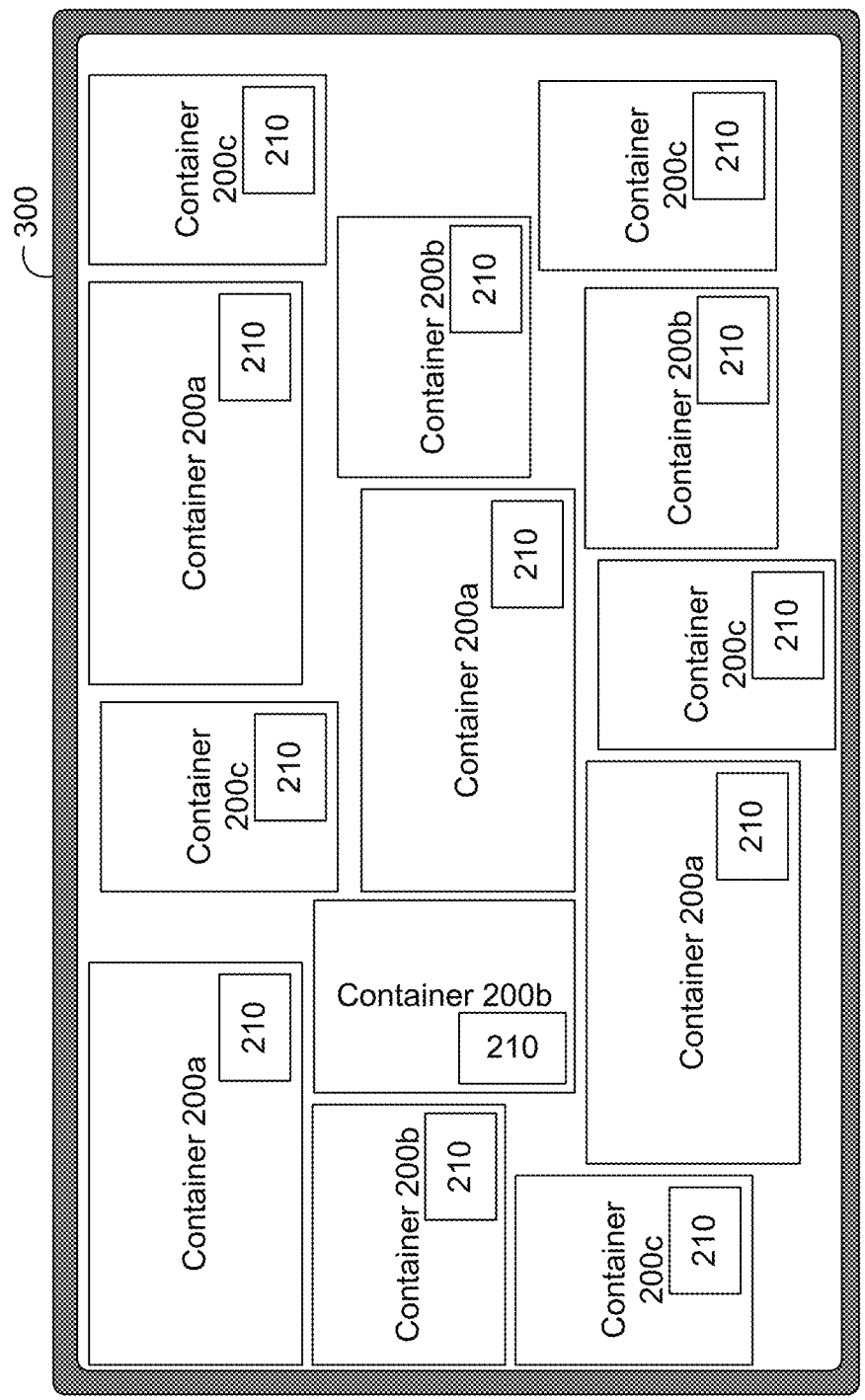
FIG. 3 is a diagrammatic view of an exemplary bulk sample container with an arrangement of tissue/sample containers, cassettes, and slides.
Figure 12A:
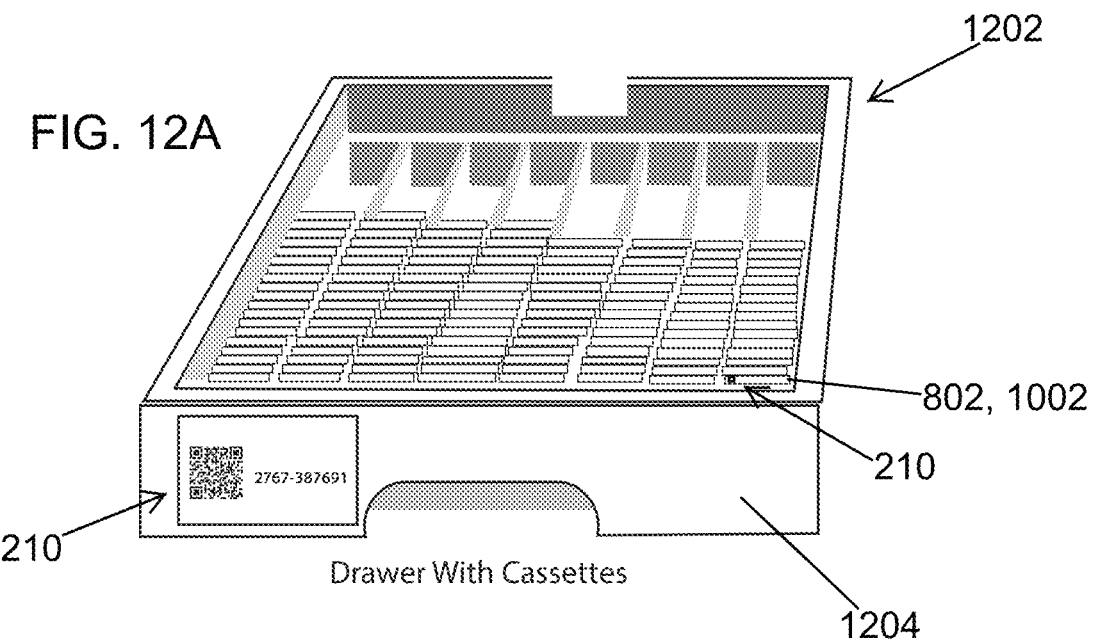
FIG. 12A is a perspective view of a drawer with cassettes, and illustrating the placement of a barcode.
Figure 12B:
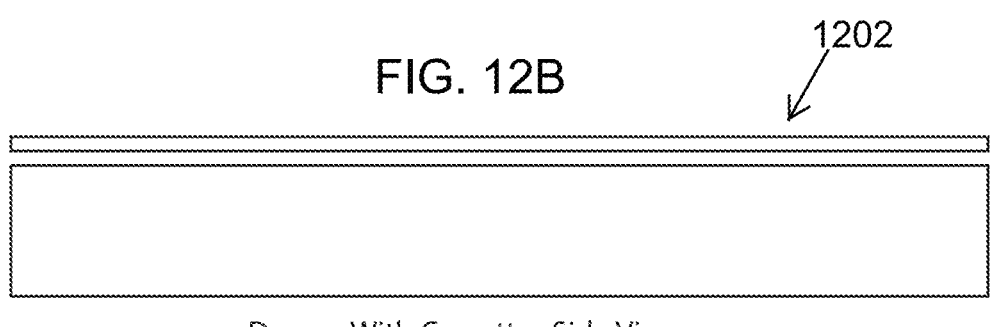
FIG. 12B is a side view of the drawer of FIG. 12A.
Figure 12C:
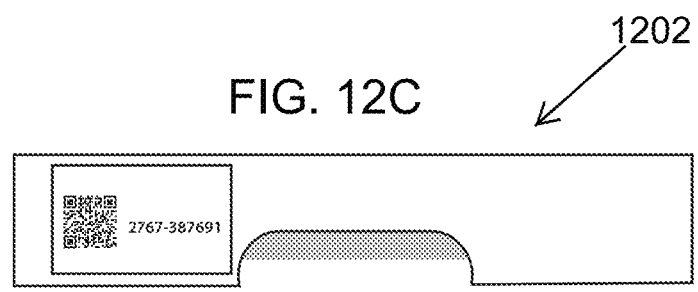
FIG. 12C is a front view of the drawer FIG. 12A.

As illustrated in FIG. 3, a collection of tissue/sample containers 200 arranged in a bulk sample container 300 may be imaged with a single image, and their respective barcodes 210 each located and decoded by scanning the single image. The tissue/sample containers 200 and the bulk sample container 300 illustrated in FIGS. 2 and 3 are exemplary in nature. Other sizes and shapes are possible. Other arrangements of the tissue/sample containers 200 in the bulk sample container 300 are also possible. For example, as illustrated in FIG. 12A-12C, an exemplary drawer 1202 is configured to hold rows of cassettes (802, 1002) that are arranged within the drawer 1202. While not illustrated in FIG. 12A, each cassette 802, 1002 is positioned upright in the drawer 1202 such that its respective barcode 210 (positioned on a front side 804, 1004 of the cassette 802, 1002) is visible within a scanner's field of view.

Figure 13A:
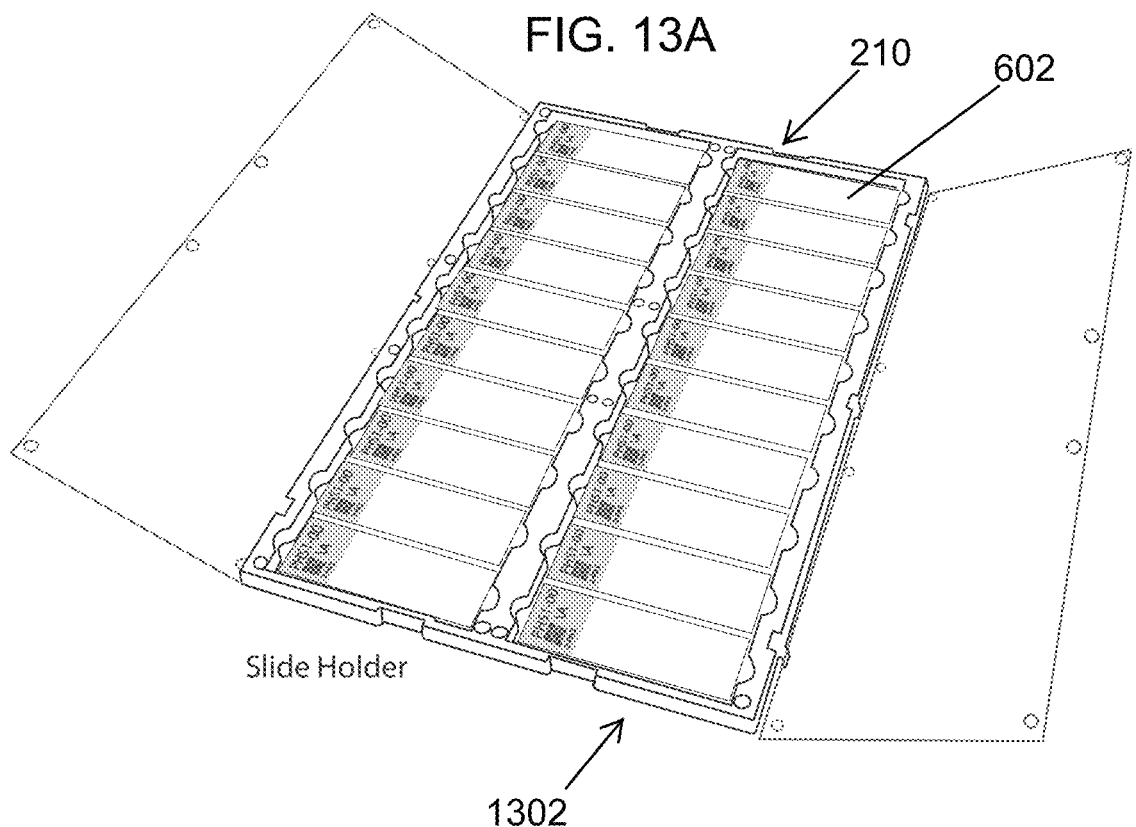
FIG. 13A is a perspective view of a slide holder with open covers and retaining microscopy slides in accordance with the present invention.
Figure 13B:
FIG. 13B is a short side view of the slide holder of FIG. 13A.
Figure 13C:
FIG. 13C is a long side view of the slide holder of FIG. 13A.
Figure 14A:
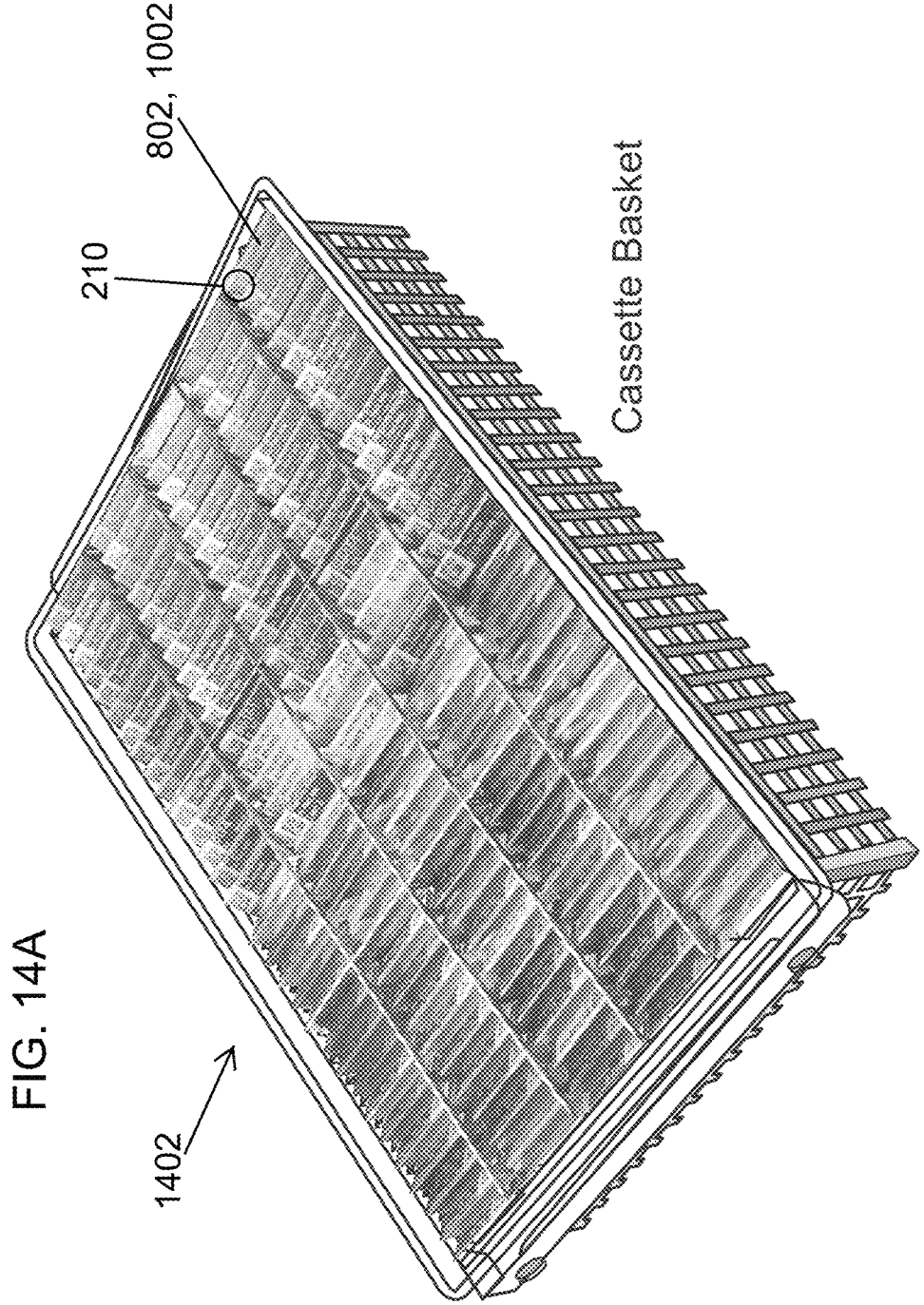
FIG. 14A is a perspective view of a cassette basket retaining cassettes in accordance with the present invention.
Figure 14B:
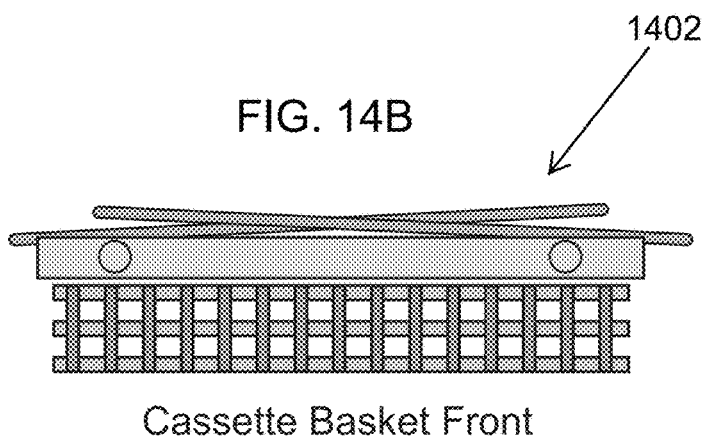
FIG. 14B is a front view of the cassette basket of FIG. 14A.
Figure 14C:
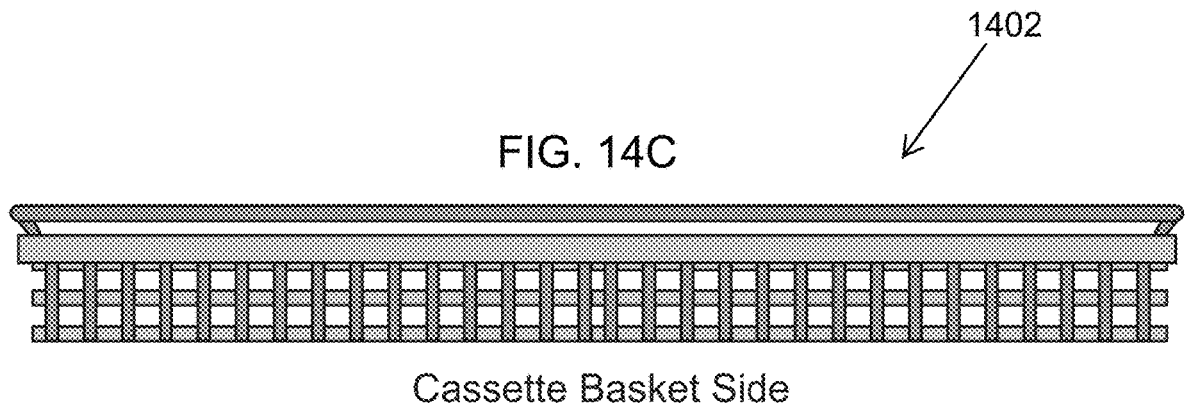
FIG. 14C is a side view of the cassette basket of FIG. 14A.

As discussed with respect to FIG. 14A, the drawer 1202 may be configured such that cassettes 802, 1002 are retained at an angle (e.g., 45 degrees) from a vertical plane that is perpendicular to the drawer 1202. As illustrated in FIGS. 12A and 12C, a barcode 210 for the drawer 1202 may also be positioned on the side of the drawer 1202. In FIGS. 13A-13C, an exemplary slide holder 1302 is configured to hold a series of 1"×3" slides (602) such that their respective barcodes 210 are visible within a scanner's field of view. While not illustrated, in an alternative embodiment, a slide holder 1302 may be configured to hold 2"×3" slides 702. As illustrated in FIG. 13A, the slide holder 1302 is configured to retain the slides 602, 702 face-up (and visible to a scanner's field of view). FIGS. 14A-14C illustrate an exemplary cassette basket 1402 configured to hold rows of cassettes (802, 1002). As illustrated in FIG. 14A, the cassette basket 1402 is further configured to retain each cassette (802, 1002) in a position such that each cassette's respective barcode 210 is visible within a scanner's field of view. The cassette basket 1402 may be further configured to hold each cassette 802, 1002 at an angle (e.g., 45 degrees) from a vertical plane that is perpendicular to the cassette basket 1402. Optionally, the cassette basket 1402 has its own identifying barcode affixed to it, so that the cassettes 802, 1002 can be readily associated with the particular cassette basket in which they are being stored or transported. The cassette basket's barcode can be scanned at the same time that the cassette barcodes 210 are being scanned.

FIG. 1 illustrates an exemplary barcode scanning apparatus 100 configured to locate and decode barcodes on containers placed within or under the barcode scanning apparatus 100. The barcode scanning apparatus 100 is configured for scanning images captured of individual containers with single barcodes or for scanning images captured of bulk sample containers that hold numerous containers, each with their own barcodes. As noted above, the bulk sample containers are configured to position (and possibly retain) those containers at an angle such that their respective barcodes are visible in a field of view of the barcode scanning apparatus 100.

The barcode scanning apparatus 100 may include adjustable feet 102 that will facilitate leveling of the barcode scanning apparatus 100 on uneven work surfaces. In the illustrated embodiment, the barcode scanning apparatus 100 includes a sample imaging area 104 that is easily accessible by operators for placing individual tissue/sample containers 200, or a bulk sample container 300 (containing multiple tissue/sample containers 200), such that barcodes 210 on the tissue/sample containers 200 (within the sample imaging area 104) are viewable from a camera assembly or imager 130 (hereinafter referred to as camera) positioned within the bulk sample container 300 (see FIG. 4).

The sample imaging area 104 is illuminated by a lighting system 106. Optionally, the lighting system 106 includes polarizers that are used to illuminate the field-of-view with polarized light. Illuminating the field of view with polarized light can reduce glints or glares in the field of view of the camera 130 that is fitted with a crossed polarizer, thereby improving the camera's ability to obtain clear images of the barcodes in the imaging area 104. The field of view of the camera 130 may cover the entire bulk sample container 300 or only a portion of the bulk sample container 300. When the camera's field of view covers only a portion of the bulk sample container 300, the camera's field of view may be adjusted such that a series of multiple images with overlapping fields of view are captured. These overlapping images may then be used in order to capture all of the barcodes present in a bulk sample container that is larger than a single field of view.

The individual tissue/sample container 200 or bulk sample container 300 (filled with multiple tissue/sample containers 200) is imaged with a camera 130 and its associated lens arrangement selected to provide: (1) a field-of-view sufficient to image all of the barcodes in the bulk sample container 300 or at least a region of interest required for a multiple exposure capture; (2) sufficient resolution to cover each two dimensional (2D) barcode square element with four (4) or more pixels; (3) an optical diffraction blur circle equal to or less than the camera pixel size; and (4) lockable adjustments on the lens system (of the camera 130) to allow camera settings for iris, focus, and polarization orientation. In one embodiment, the camera 130 is a monochromatic camera. Other embodiments are also possible, such as color imagers and the like.

Figure 4:
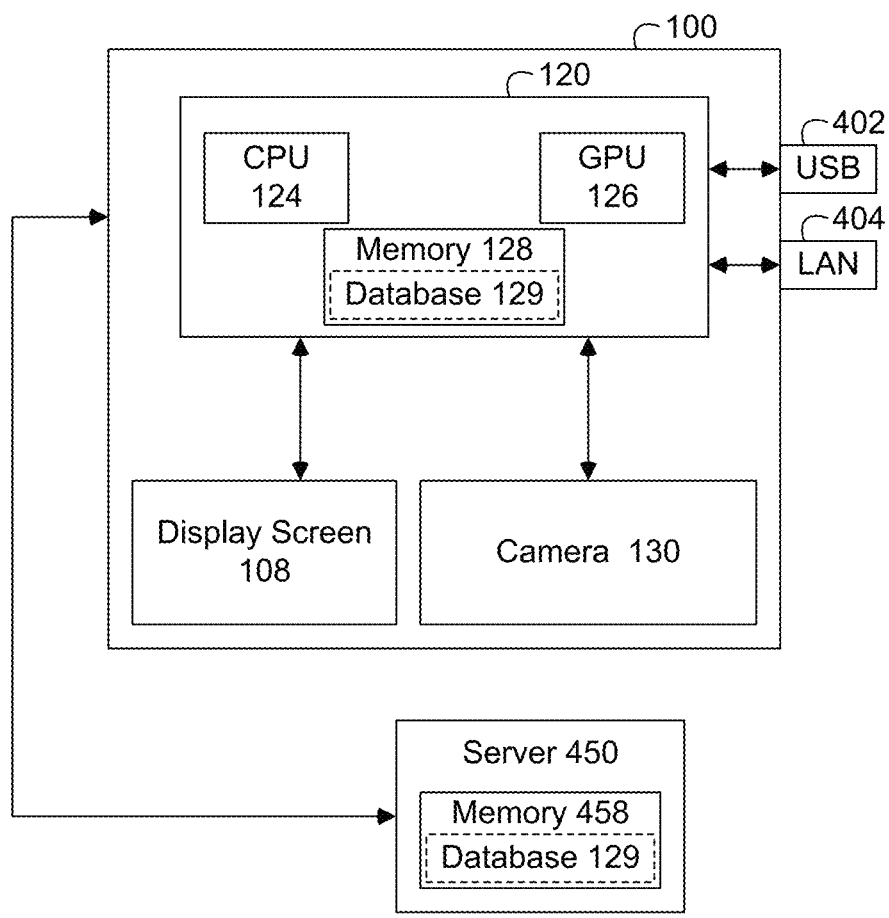
FIG. 4 is a block diagram of a barcode scanning apparatus illustrating processing subunits in accordance with the present invention.

The barcode scanning apparatus 100 may include an analyzer/image processor with orientation adjustments to allow for cross polarization with respect to the illumination polarizers to allow for the elimination or at least reduction of glints or glares in the captured image. As illustrated in FIG. 4, all algorithmic processes performed by the analyzer/image processor of the barcode scanning apparatus 100 (e.g., camera control, scanning processes, image processing, and barcode locating/decoding) are carried out by a computer 120 that may include a multi-core micro processing unit (CPU) 124 as well as a multi-core graphics processing unit (GPU) 126 to facilitate high speed image processing and analysis. The computer 120 is communicatively coupled to the camera 130 for controlling the operation of the camera 130 and for receiving and processing digital image data received from the camera 130.

In the illustrated embodiment, the camera 130 is mounted with adjustments to provide for an adjustable sizing of the field-of-view. The barcode scanning apparatus 100 may include a mirror mounted at 45 degrees to allow for the reflecting of the light path (to the imager) to keep the height of the barcode scanning apparatus 100 low.

Optionally, the camera 130 and its associated lenses may be sealed within a housing with a window and access cover to keep dust, debris, and fluids from contaminating the camera 130 and its associated optical system. A ventilation port in the housing may also be provided to facilitate fume abatement when used in the presence of typical pathology fixatives. The housing of the barcode scanning apparatus 100 may be used to house the computer/processor 120 and to allow for ventilation. The housing will also allow for associated cabling to be unobstructed.

As illustrated in FIG. 1, the barcode scanning apparatus 100 includes a display screen 108 for presentation of a user interface (UI). The display screen 108 is mounted with the ability to tilt up and down for user comfort. The display screen 108 may be either touch or non-touch responsive.

Other embodiments are also available, e.g., detachable display screen 108 or cabling to a remote display screen 108.

Optionally, and as illustrated in FIG. 4, the barcode scanning apparatus 100 includes external USB ports 402 arranged on the housing to facilitate accessory connections (e.g., mouse, keyboard, barcode scanner, and thumb drive access). An external LAN port 404 may also be provided to allow for connection to an institution's network. An external power switch may be arranged for powering ON/OFF the lighting system 106. Similarly, a main power switch for the computer/processor 120 and camera assembly 130 may also be arranged on the housing of the barcode scanning apparatus 100.

The barcode scanning apparatus 100 may be further configured to allow an operator to control the operation of the barcode scanning apparatus 100, as well as display imaging and image processing results via a user interface (UI) displayed on the display screen 108. For example, the UI can facilitate the operator in quickly aligning individual tissue/sample containers 200 or a bulk sample container 300 (containing multiple tissue/sample containers 200) using a live image display depicted on the display screen 108. The UI also includes START/STOP functionality via control buttons depicted in the UI. The UI will also provide feedback to the operator on current operational states (e.g., image scanning, image processing, and barcode scanning).

As discussed in detail below, upon starting a scanning process on a tissue/sample container 200 or bulk sample container 300 positioned in the sample imaging area 104, the camera 130 will select an exposure for capturing an image of the tissue/sample container 200 or bulk sample container 300 in the sample imaging area 104. Optionally, the camera 130 may capture images via autoexposure controls. After generating the image, a GPU 126 in the barcode scanning apparatus 100 may be used to perform image enhancement steps (see FIG. 5) that include a series of low bit-depth binary images based upon setup criteria targeted at the printing quality of selected barcode scanners. After creating the series of low bit depth binary images, an algorithm searches subsections of the image for 2D barcodes.

After completing the scanning process, the algorithm (as visualized on the UI) may place color-coded graphics boxes around each identified barcode (e.g., green and yellow boxes; however, other colors could be used). That is, green boxes could be used for uniquely serialized barcodes and yellow boxes for detected duplicate barcodes. While red boxes (e.g., rectangles) may be placed in areas where no barcodes were found, but due to known container 200 spacing on a bulk sample container 300 or level certainty from a detection algorithm that a barcode exists but is not readable, the algorithm identifies an area where a barcode could be (identified by the red box). Optionally, other colors may be used to flag samples that are of interest such as "stat" cases that should be processed in following steps first to ensure they are completed as fast as possible, or for other necessary reasons.

The UI provides tools for an operator to "correct" the red flagged areas that contain barcodes automatically and/or under the operator's interaction. For example, the UI provides manual input for an operator to read human recognizable characters on a label area and to input appropriate characters via a keyboard interface. The human recognizable characters are usually separately printed in a slightly different area of the sample/tissue container 200 and represents the data that is in the barcode. The UI may also provide a handheld barcode scanner input, where a magnified image of the area is displayed so that the operator can use a handheld barcode scanner to scan the magnified image on the display screen 108. Optionally, the tissue/sample container 200 in question can be removed from the bulk sample container 300 and scanned directly with the handheld barcode scanner. The UI may also provide optical character recognition allowing the operator to select a red rectangular area and have the processor analyze the image for human readable characters for input. A parsing engine may be required to format the data properly. Lastly, the UI may provide an "intense rescan" that allows for a selected red area to be run through an image enhancement algorithm with additional levels of enhancement. These additional levels are then processed through the barcode acquisition algorithm. In an exemplary embodiment, the intense rescan takes the selected sub-area (the selected red area) and generates twenty (20) adjusted levels of the image area and presents these to the barcode detection algorithm. Additionally, there are provisions for the operator to select to have a sample container barcode reprinted and the sample transferred into the newly barcoded container or a new barcode label affixed to the existing container.

The stored scanned data can be used to provide sample tracking and sorting functions such as: [1] Automatic manifest paperwork printout be included with shipments when leaving one location to be checked in at another location, [2] Auto late warnings and alarms that can be set to detect when a sample or bulk container full of samples are late beyond set periods getting from one waypoint to another and mentioned warnings or alarms can be automatically communicated to individuals designated with an editable alarm contact list using email, SMS text messaging or other electronic means, [3] reporting at a designated reconcile waypoint when any sample is missing from the incoming scanned manifest, [4] checking slide locations in slide folders to determine if: [A] that all the slides for a given case are in the slide holder and the case is complete and ready to be moved to the next process, [B] slides within a case are in order (for example, by levels or by staining technique), and [C] that slides from one case are not mixed with slides from another case, or other quality checks.

Once the operator is satisfied with the scan, the operator can approve the scan via the UI and the barcode scanning apparatus 100 will record the barcode data and its position to an archive database 129. The database 129 may be located either on the barcode scanning apparatus 100, in for example, memory 128, or on a network server 450, in for example, memory 458, for access to other networked workstations (see FIG. 4).

The barcode scanning apparatus 100 may also include provisions to facilitate HIPAA compliant data transmission and encryption and backup protocol features to ensure data security. Such steps are related to the encryption of transmitted data as well as a buffered hierarchical database structure that will cache data locally for use during LAN outages.

The scanned data and images captured by the barcode scanning apparatus 100 may be processed for several different purposes/operations: basic hand scan emulation software, integrated LIS Interface software modulation, tissue chain of custody, and sample archiving. Furthermore, associated image areas can be used to document tissue on a slide and then process those images of tissue for other quality assurance (QA) tasks.

A basic hand scan emulation software module may be implemented as an application that interrogates a Network Database Repository looking for data that is flagged for use on the barcode scanning apparatus 100, i.e., by user login or destination flag set by the operator during the container scan. When the application locates data targeted for the workstation that it is on, it sends a notification to the operator's own desktop computer or other personal computing device that new data is available. The operator then clicks on data, copies the data to temporary memory ("clipboard"), and then can transfer ("paste") the data into the laboratory information system tracking input field. This can save the operator time and reduce the occurrence of error related to missed containers.

An integrated LIS interface software module uses hospital network interface message language calls, e.g., HL7 or proprietary LIS/EMR data interfaces, to parse the barcodes into relevant fields to be used for quality assurance tracking of the process workflow. Manifest information is retrieved of what samples have departed the previous process way point and should be arriving at this way point. It may also have a timer function for both container and samples that can be set to provide a notification if: a sample is missing from a previous waypoint scan, a container is unduly tardy in arriving at this waypoint, or a sample is unduly tardy in arriving at this way point. Via an interface, tissue/sample containers 200 may be removed or rerouted from a workflow process. Analysis of sample/tissue ordering is provided within a sample/tissue container 200 as in the case of slide indexes: to insure that all case slides are included in the slide case index and that no slides from other cases are misplaced into this case, and that the slides are placed in protocol order for specimen piece, block number, stain and cut depth level. Lastly, a waypoint may be recorded to track images and scanned data fields into the database 129 and to further provide an auto purging algorithm to free up database space after an operator set time period.

A sample archiving module is configured to provide tissue/sample archive management features. For example, bulk scan reading of tissue/sample containers 200 to determine associations of individual tissues/samples to a specific tissue/sample container 200. This mode will allow multiple image captures of oversized containers 200 to be taken and automatically account for redundant scans in areas of image overlap. This will allow the use of "standard," non-proprietary containers 200. Transaction dates and reference images of containers and samples may be recorded, as well as the storage locations in the database 129. A contact database for users and storage locations may be maintained. The sample archiving module may also include the ability to provide for the printing of shipping labels to assist in the preparation of sample shipment. A transaction form feature may be used to assist in the preparation of shipment paperwork notifications and tracking forms. An email notification system or electronic order fulfillment interface may provide automated notification messages to target contacts during transactions related to the sample management. A sample retrieval request workflow may be used to automatically generate notifications, transaction paperwork, and sample tracking records, as well as overdue notices to a sample borrower for return of samples after a prescribed time-period (providing shipping labels and barcode tracking labels). A refiling workflow may be used to allow for the return of a sample to the storage archive with the next standard archive delivery. This avoids the need and cost of refiling the sample back to its original location. The sample archiving module will automatically record the new location for tracking. A purge feature may be provided that will notify operators and provide paperwork for samples to be remove from long-term storage and disposed of after a prescribed date. The sample archiving module may also continue to maintain the historical tracking records for these samples for an additional time period at which time the data can be set to be purged from the database 129.

Figure 5:
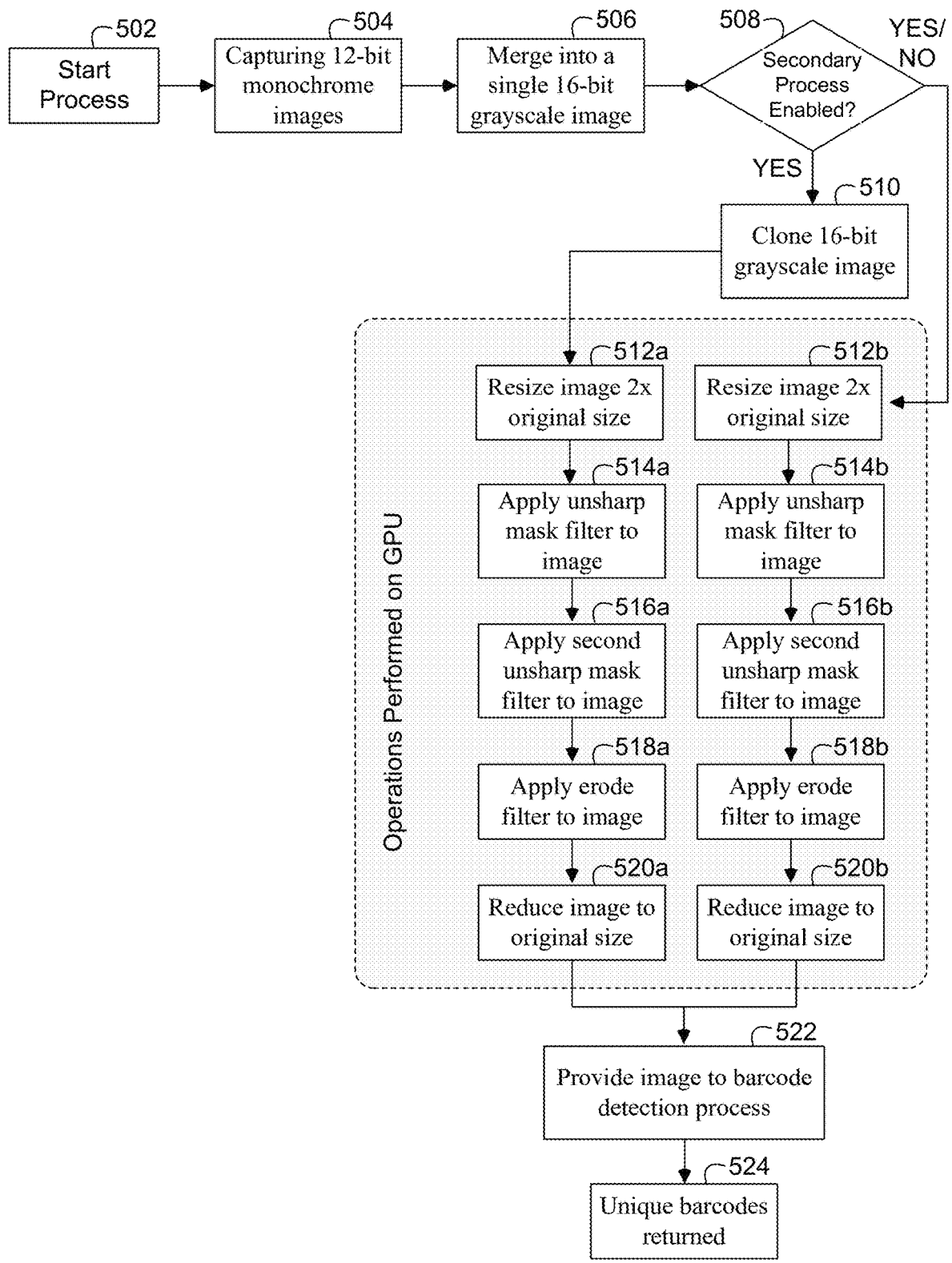
FIG. 5 is a flow diagram illustrating a method for image enhancement and barcode detection in accordance with the present invention

FIG. 5 illustrates a method for image enhancement and barcode detection. In step 502 of FIG. 5, the process starts after one or more tissue/sample containers 200, or a bulk sample container 300 (containing multiple tissue/sample containers 200) has been positioned onto the sample imaging area 104. Positioning of the tissue/sample containers 200 or bulk sample container 300 may also include adjusting the field-of-view to ensure that the field-of-view adequately covers the placed tissue/sample containers 200 or bulk sample container 300, as well as ensuring the lighting system 106 evenly illuminates the desired field-of-view.

In step 504 of FIG. 5, the camera 130 captures an image of the tissue/sample containers 200 or bulk sample container 300. Capturing the image also includes capturing a number of 12-bit monochrome images. As illustrated in step 504 of FIG. 5, sixteen (16) 12-bit monochrome images are captured. Other numbers of monochrome images may be captured. Furthermore, other bit-depths may be used.

In step 506 of FIG. 5, the captured images are merged into a single 16-bit grayscale image. Such merging, or image stacking, increases the effective "well depth" and signal collected, which reduces both the read noise and the shot noise in the captured image. Such image stacking therefore increase the signal-to-noise ratio of the captured image.

In step 508 of FIG. 5, the process determines whether a secondary process is enabled. In step 510 of FIG. 5, if step 508 determines that a secondary process is enabled, the 16-bit grayscale image is cloned. Such cloning creates a copy of the original image. The secondary or parallel process allows the process of FIG. 5 to correct for multiple types of errors. For example, the primary variance between the two processes illustrated in FIG. 5 may be the parameters used in the individual steps (e.g., the un-sharp masks). The variances in such parameters may, for example, be selected to correct for a particular institution's barcode printer errors.

In steps 512*a* and 512*b* of FIG. 5, the original image and the clone image are resized 2× the original size, respectively. Such image doubling smooths the edge detail transitions and helps to eliminate special truncation errors in the following steps of FIG. 5.

In steps 514*a* and 514*b* of FIG. 5, the resized original image and the resized clone image have unsharp mask filters applied, respectively. In the first unsharp filter, high step value edge transitions are enhanced, while broad, low step value changes are kept smooth.

In steps 516*a* and 516*b* of FIG. 5, the resized original image and the resized clone image have second unsharp mask filters applied, respectively. In the second unsharp filter, the brightness intensity is normalized. This brightness intensity occurs from different colored cassettes or other sample/tissue containers 200.

In steps 518*a* and 518*b* of FIG. 5, after the first and second unsharp mask filters, erode filters are applied to the original image and the clone image, respectively. An erode filter fills in areas of the image that have printing gaps less than a threshold size of the expected barcode dot. This "filling in" corrects a portion of the incompletely printed dots on the barcode.

In steps 520*a* and 520*b* of FIG. 5, the resized and filtered original image and clone image, are reduced to original size, respectively. Such image reduction (back to the original size) saves processing time for the barcode detection step in step 522 of FIG. 5.

In step 522 of FIG. 5, the original image and clone image are provided to a barcode detection process. The original image and the clone image are individually provided to the barcode detection process for barcode identification and scanning. The results are then sorted, and duplicate scans are deleted, leaving the final data set. In step 524 of FIG. 5, after the barcode detection process, unique barcodes detected and decoded from the original image and clone image are returned.

As illustrated in FIG. 5, steps 512*a/b*, 514*a/b*, 516*a/b*, 518*a/b*, and 520*a/b* are performed in the GPU 126. In other words, these steps are performed by software running on graphics processing hardware in the GPU 126.

Thus, sample/tissue containers 200 and bulk sample containers 300 (carrying sample/tissue containers 200) may be imaged so that barcodes 210 printed on the sample/tissue containers 200 may be located, scanned, and decoded. As noted herein, the term "barcode," has been used to describe any type of machine-readable optical indicia, such as one-dimensional barcodes comprising a series of parallel lines and two-dimensional matrix codes (e.g., a QR matrix code). As illustrated in FIGS. 6-11, microscopy slides (602, 702) and cassettes (802, 1002), retaining specimens, may be positioned and retained in a slide holder 1302 or cassette basket 1402, or in a cassette drawer 1202, respectively. A further benefit is that the barcodes on sample/tissue containers 200 carried on a bulk sample container 300 may be located and scanned on a single image after image processing steps are taken on the image to improve the depicted barcodes.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. An apparatus for scanning and decoding barcodes, the apparatus comprising:
   an imager configured to capture images within a selectable field of view;
   a sample imaging area configured to support a bulk sample container configured to carry a plurality of sample/tissue containers, wherein each sample/tissue container comprises a respective barcode, wherein at least a portion of the bulk sample container is positioned within the field of view, such that a plurality of the respective barcodes are within the field of view;
   a lighting system configured to illuminate the field of view;
   a processor configured to receive captured images from the imager; and
   wherein the processor is configured to create a second image that is a clone of a first image of the captured images, and wherein the processor is configured to separately analyze both the first image and the second image and to detect and decode each of the plurality of respective barcodes present in at least one of the first image and the second image.

2. The apparatus of claim 1, further in combination with the bulk sample container, wherein the bulk sample container is configured to retain and position the plurality of sample/tissue containers such that each respective barcode on each sample/tissue container is positioned to be viewable when within the field of view, and wherein each respective barcode is one of: a one-dimensional barcode comprising a series of parallel lines, and a two-dimensional barcode comprising a data matrix.

3. The apparatus of claim 1, further in combination with the bulk sample container and with the plurality of sample/tissue containers, wherein a first sample/tissue container of the plurality of sample/tissue containers comprises any one of: a tissue biopsy cassette, a microscope slide, and a tissue sample carrier.

4. The apparatus of claim 3, wherein the bulk sample container is configured to carry a variety of different sample/tissue containers.

5. The apparatus of claim 1, wherein the lighting system comprises a polarizer configured to reduce glints in the field of view.

6. The apparatus of claim 1, further in combination with the bulk sample container, wherein the imager is further configured to adjust the position of the field of view to cover at least a selected portion of a bulk sample container, and wherein the imager is further configured to capture multiple images with overlapping corresponding fields of view to cover a plurality of different portions of the bulk sample container in order to capture all of the barcodes present in the bulk sample container, and wherein the bulk sample container is larger than a single field of view.

7. The apparatus of claim 1, wherein the processor is configured to scan the first image to identify locations of barcodes present in the first image.

8. The apparatus of claim 1, wherein the processor is configured to perform image processing on at least one of the first image and the second image before analysis, wherein the image processing includes at least one of: image size doubling, unsharp mask filtering, and erode filtering, and wherein the image processing performed on the first image is different from the image processing performed on the second image.

9. The apparatus of claim 8, wherein the image processing includes image size doubling that is configured to increase signal-to-noise ratio of the first image.

10. The apparatus of claim 8, wherein the image processing includes unsharp mask filtering that is configured to perform at least one of: enhancing high step value edge transitions to reduce special truncation errors in further image processing; and normalizing brightness intensity occurring from different colored containers.

11. The apparatus of claim 8, wherein the image processing includes erode filtering that is configured to fill in areas of the first image that have printing gaps less than a threshold size of an expected barcode dot.

12. A method for scanning and decoding barcodes, the method comprising:
    positioning a bulk sample container supporting a plurality of sample/tissue containers within a selectable field of view, wherein each sample/tissue container comprises a respective barcode;
    lighting the field of view with a polarized light;
    capturing images within the field of view, wherein a first image of the captured images includes a depiction of a plurality of the respective barcodes within the field of view;
    creating a second image that is a clone of the first image; and
    analyzing both the first image and the second image to detect and decode each of the plurality of respective barcodes present in at least one of the first image and the second image.

13. The method of claim 12, wherein a first sample/tissue container of the plurality of sample/tissue containers comprises one of: a tissue biopsy cassette, a microscope slide, and a tissue sample carrier.

14. The method of claim 12, wherein the bulk sample container is configured to carry a variety of different types of sample/tissue containers, wherein the bulk sample container is configured to retain and position the variety of different types of sample/tissue containers such that each respective barcode on each sample/tissue container is positioned to be viewable when within the field of view, and wherein each respective barcode is one of: a one-dimensional barcode comprising a series of parallel lines, and a two-dimensional barcode comprising a data matrix.

15. The method of claim 12, further comprising:
    adjusting the field of view to cover at least a selected portion of a bulk sample container; and
    capturing multiple images with overlapping corresponding fields of view to cover a plurality of different portions of the bulk sample container in order to capture all of the barcodes present in the bulk sample container, and wherein the bulk sample container is larger than a single field of view.

16. The method of claim 12, wherein detecting each of the barcodes present in the first image comprises identifying a location for each barcode present.

17. The method of claim 12 further comprising processing at least one of the first image and the second image before analyzing the first image and the second image, wherein processing comprises at least one of: doubling an image size, unsharp mask filtering, and erode filtering, and wherein the processing performed on the first image is different from the processing performed on the second image.

18. The method of claim 17, wherein the processing comprises doubling an image size that comprises increases signal-to-noise ratio of the first image.

19. The method of claim 17, wherein the processing comprises unsharp mask filtering that comprises one of enhancing high step value edge transitions to reduce special truncation errors in further image processing; and normalizing brightness intensity occurring from different colored containers.

20. The method of claim 17, wherein the processing comprises erode filtering that comprises filling in areas of the first image that have printing gaps less than a threshold size of an expected barcode dot.

* * * * *